Oct. 19, 1965  G. T. RANDOL  3,212,408
PRESSURE-DIFFERENTIAL OPERATED BRAKE BOOSTER MECHANISM
Filed March 16, 1962  4 Sheets-Sheet 4

United States Patent Office 3,212,408
Patented Oct. 19, 1965

3,212,408
PRESSURE-DIFFERENTIAL OPERATED BRAKE
BOOSTER MECHANISM
Glenn T. Randol, 3 E. 2nd Ave., Loch Lynn,
Mountain Lake Park, Md.
Filed Mar. 16, 1962, Ser. No. 180,294
9 Claims. (Cl. 91—369)

This invention relates to a power unit for automotive hydraulic brakes adapted for providing the major portion of the operating force to apply the brakes on an automotive vehicle or the like, said unit being characterized by having a cooperative relationship with a brake master cylinder of substantially conventional construction and operation, whereby brake applications are effected by combined power and operator forces or by operator force alone.

The primary object of the invention is to provide an improved power unit for use in automotive hydraulic brake systems wherein the power unit and the master cylinder are arranged as a unitary structure with the working parts thereof which induce hydraulic-fluid displacement coaxially disposed.

It is another object of the invention to provide a novel power unit disclosed herein as a pressure differential operated motor comprising a novel movable power assembly or wall preferably of the piston-type that power-actuates in part the aforesaid working parts to pressurize the hydraulic fluid in the master cylinder in cooperation with operator force transmitted through reaction means interposed in said working parts.

Another object of the invention is to provide novel spring-biased sealing means at the point where the valve actuator projects from the power unit for connection to the pedal operated linkage, and wherein said spring-bias is effective to yieldably oppose pedal-operation of said valve actuator from normal position thereof.

Another object of my invention is to provide novel pressurized sealing means for the peripheral portion of said power assembly, said means comprising an annular pressurized pliant member defining the periphery of said power assembly, and which maintains continuous contact under tension with the complemental cylindrical surface in the power cylinder of said power unit to effect an airtight seal therebetween. Optionally, the periphery of said sealing member may be provided with spaced annular ribs defining annular channels therebetween for the reception of lubricant to lubricate the working surfaces between the sealing member and power cylinder, and wherein the interior of the sealing member may serve as a reservoir for the lubricant for expulsion through minute metering holes through the walls of the channels aforesaid to lubricate said working surfaces under pressure.

Still another object of the invention related to the object next preceding, is to provide a pressure differential operated motor for an automotive hydraulic brake system, that incorporates a new and improved control valve mechanism which includes a pair of elements relatively movable rectilinearly for controlling application of negative (vacuum) pressure to one side of the power-piston, said valve elements being of the self-sealing type effected by joint spring and pressure differential forces, said valve elements being adapted for follow-up actuation under influence of an operator-operated actuator member with which one of said valve elements is operatively connected directly, while the other valve element is characterized by radial "floating" movement with respect to said power-piston to cooperate with said one valve element to control said pressure differential.

It is still another object of the invention related to the object next above, to provide novel actuating mechanism whereby the aforesaid one valve element mounted directly on said actuator member to move as a unit therewith from normal "off" position to operating "on" position to induce power-assist by said motor, and wherein there is provided combined spring and pressure differential forces acting across a predetermined area on the exterior of said valve elements to effectively seal the same against pressure losses.

More specifically, the invention aims to provide such a control valve with a source of negative pressure (vacuum) preferably produced within the inlet-manifold of an internal-combustion engine, and wherein vacuum losses are prevented by the combined sealing forces, especially when the motor controlled thereby is de-energized with the vehicle brakes "off."

Another object of the invention related to the two objects immediately above, is to provide such a pair of valve elements characterized by relative sliding movement as distinguished from rotary types, and wherein the vacuum and atomspheric openings in said valve mechanism communicating with the negative pressure side thereof may be varied in size to insure rapid excursion and incursion of air from and to said negative pressure side of the power-piston for sensitizing power-activation and inactivation respectively of said motor thereby eliminating any tendency for dashpot action in the motor to slow brake application and release irrespective of the rapidity of movement of the operator-operated member (brake-pedal).

Another salient feature of the invention is to produce a simple, low-cost booster brake mechanism that would require a minimum of service maintenance; that can be fabricated in most part from metal stampings; that can be readily installed in the engine-compartment on the firewall in substantially the same space occupied by the factory-installed master cylinder; and that utilizes the conventional foot-operated firewall mounted master cylinder without disassembly thereof, as the hydraulic pressurizing unit thus keeping the hydraulic brake system on the automotive vehicle intact without even the necessity for bleeding the hydraulic lines when installing the present booster unit.

Additional objects and advantages of the present invention will be apparent from the following detailed description, reference being had to the accompanying drawings wherein a preferred embodiment of the invention is exemplarily illustrated.

Referring now to the drawings, the power unit of the present invention is disclosed as a pressure-differential operated motor generally designated "PM" that comprises a cup-shaped casing or cylinder 10 having an integral end wall 11 and a detachable cup-shaped member (wall) 12 closes its open end. A power assembly is reciprocably mounted within said power cylinder and moves from a normally released position depicted in FIGURE 1, and is generally designated "PP," said assembly being preferably of the solid-piston type as distinguished from a flexible-diaphragm type. The power assembly or pressure-responsive unit which for flexibility of terminology in describing and claiming the invention will be referred to as a "power-piston," "power member" or "wall," and which divides the interior of the power cylinder into a constant pressure (atmospheric) chamber 14 and a variable pressure (vacuum) chamber 15, both chambers being balanced at atmospheric level of pressure when the power-piston PP is in normal position, thus the present booster motor PM is commercially designated the air-suspended type as distinguished from the vacuum-suspended type characterized by equivalent negative (vacuum) pressure conditions in both chambers when the booster motor is de-energized. A conventional master brake cylinder designated "MC" is provided with a body 16 mounted on the end wall 11 of the power cylinder 10 in airtight sealed relation thereto as by a plurality of bolts 17 as shown, said master cylinder supplying the pressurized fluid to the vehicle brake system to actuate the same.

Therefore, the booster brake mechanism designated as a whole "BM" comprises the booster motor PM and the aforesaid master cylinder MC in a unitary coaxial assembly.

The power-piston assembly PP actuates a work-performing member disclosed herein as a push-rod or plunger 18 that has its forward axially adjustable end projecting into engagement with the bottom of a cavity in a spool-type hydraulic piston 19 slidably disposed in a longitudinal bore 20 in the master cylinder body 16, said bore being closed at its forward end 21 and open at its opposite rear end 22 whereby coaction between the piston 19 and power-piston PP effects the major portion of the application of pressure on the brake fluid in a variable volume working chamber 25 disposed between the closed end 21 of said bore 20 and the confronting head 26 on said hydraulic piston 19, to supply brake actuating fluid under pressure to the brake system of the motor vehicle as is understood.

A hydraulic fluid reservoir 27 is provided in the master cylinder body 16 to supply fluid under gravitational force to said bore 20 via a compensating port 28 controlled by the head of said piston 19, and an inlet port 29 in continuous communication with an annular fluid chamber 30 encircling said piston 19 to enable adjustment of fluid volume in said working chamber 25 to accommodate full release of the vehicle brakes without cavitating the brake lines.

Hydraulic fluid under pressure is discharged from the working chamber 25 of the master cylinder through a discharge opening 31, and a residual pressure and discharge check-valve assembly generally designated "RCV" of conventional construction and operation into the pressure lines 32 leading to the wheel cylinders (not shown) provided in the brakes (not shown) for each of the wheels of the motor vehicle.

A normally preloaded compression spring 35 is disposed in the hydraulic working chamber 25 to react between the residual pressure valve RCV and the master cylinder piston 19 to urge the latter into normally released position wherein said compensating port 28 is open to accommodate fluid flow between the working chamber and reservoir, and the piston engages a backing washer 36 held from displacement by a split abutment ring 37 engaging an internal annular groove 38 adjacent the open end of said bore 20.

Actuation of the power-piston PP is controlled by operation of a novel followup-type control valve mechanism generally designated "CV" to selectively control connection of one side (power chamber 15) of the power-piston PP with a source of negative pressure, such as vacuum created within the inlet-manifold of an internal-combustion engine of any conventional motor vehicle, and to the atmosphere. The control valve CV is operated in part by a valve carriage or actuator having rectilinear movement and designated as a whole "VA" and disclosed herein as a horizontally disposed member of rectangular cross section having a normal width portion 41 wholly disposed within the power cylinder and a narrower portion 42 projecting rearward to the exterior of the closure wall 12. This narrower portion 42 may be produced in rectangular cross section as shown, or optionally as an elongated cylindrical element connected to the normal width portion 41 within the power cylinder to move as a unit. Aligned rectangular openings of substantially the same size and configuration as the narrow portion 42, are provided through the central portions of the wall 12 and lower lip portion 43 with projects laterally from the lower end of a vertically elongated rubber sealing grommet 44, the outer surface of the lip portion being annular and tapered for an important purpose to appear. An aperture 45 complemental to the aforesaid openings, is provided in the lower end of a pressure-applying backing plate 46 which overlies the sealing grommet, and adapted to stabilize the grommet sealing portion in sealing position as shown. The narrow portion 42 of the valve actuator VA passes through said openings and aperture to the exterior of the closure plate 12 for actuation as will appear. The annular outer tapered surface of the lip portion 43 projects into a complemental tapered opening 47, said tapered surfaces cooperating to bias the lip portion radially inwardly into intimate contact around the narrow portion 42 of the valve actuator to maintain an airtight seal therebetween through the full operating stroke of said actuator. A rod 48 is adapted to slidably support the outer end of the valve actuator as shown to stabilize rectilinear movement thereof under influence of operator force exerted thereon. This support rod is spaced parallelly with respect to the axis of the valve actuator VA with one end 49 fixed to a forward interconnecting segment 50 in which said tapered opening is processed, of a mounting bracket assembly designated "BR." The mounting bracket is mounted on the closure wall 12 as by a plurality of rivets which passes through the segment 50 as shown, to mount the booster brake unit BM in operating position, preferably on the firewall 51 of the vehicle in the engine compartment thereof.

Figure 1:
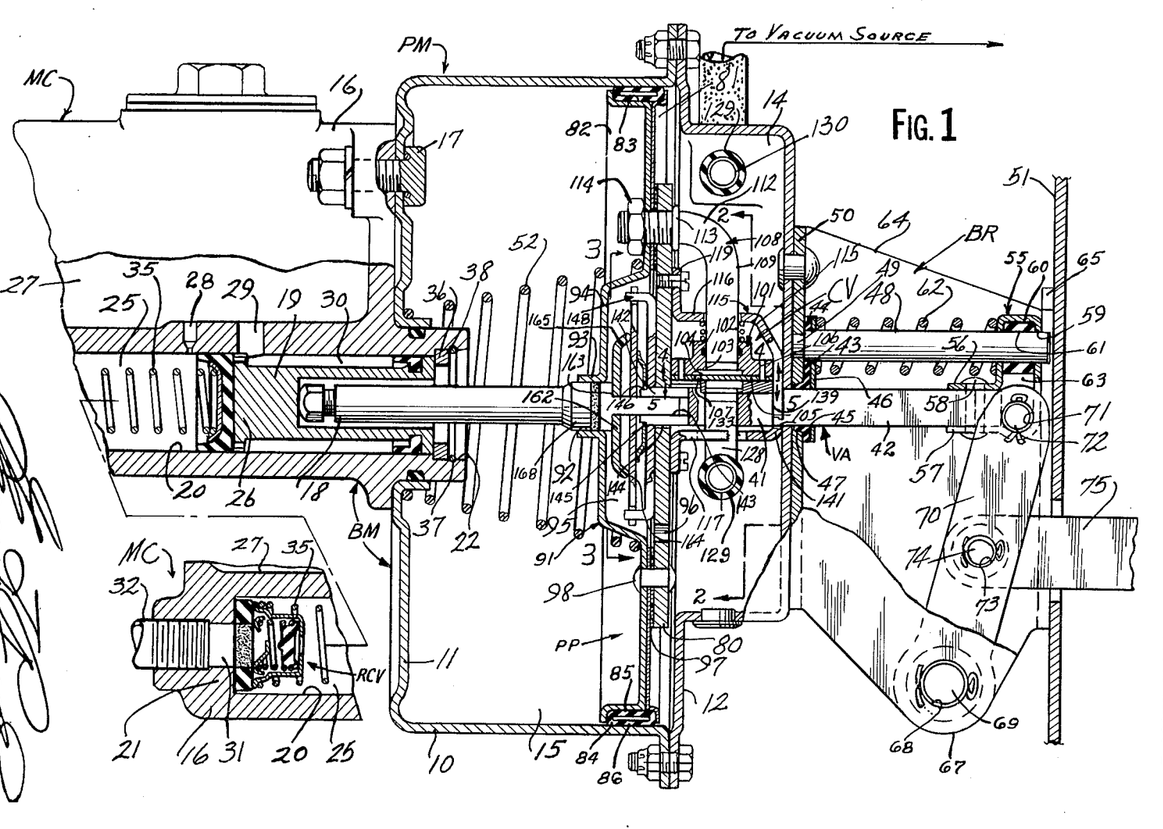
FIGURE 1 is a longitudinal-vertical sectional view of a brake booster mechanism constructed in accordance with the present invention with the parts being illustrated in normally relaxed or inactive position.

The valve actuator VA actuates in response to an operator-operated member disclosed herein as a brake-pedal "P" having a normally released position as demonstrated in FIGURE 1. The brake-pedal is connected to the outer end of the valve actuator to actuate the same in unison therewith. A normally preloaded compression spring 52 is operably disposed wholly within the vacuum-power chamber 15 of the power cylinder 10, to react between the inner side of the end wall 11 and the confronting side of the power-piston PP, to continuously urge the latter toward its normally released position depicted in FIGURE 1. This spring is preferably of conical configuration to nest at each end against and around different sized annular shoulder inherent in the construction of the present booster apparatus as shown on the drawing, and thereby stabilizes the spring in operating position free of radial deflection during compressive action.

Operation of the brake-pedal P will cause physical actuation of the valve actuator VA which in turn effects operation in part of the control valve CV through novel interconnecting mechanism to induce power-activation of said booster motor PM to assist in pressurizing the brake fluid in said master brake cylinder, and thereby supply such actuating fluid to the wheel cylinders (not shown) to brake the wheels of the vehicle. Therefore, the fluid-displacing components in the present booster apparatus are seen to comprise the valve actuator VA, push-rod 18 and connected spool-type piston 19 movable along a common axis as demonstrated in FIGURE 1.

Figures 2, 3, 4, 5, 6:
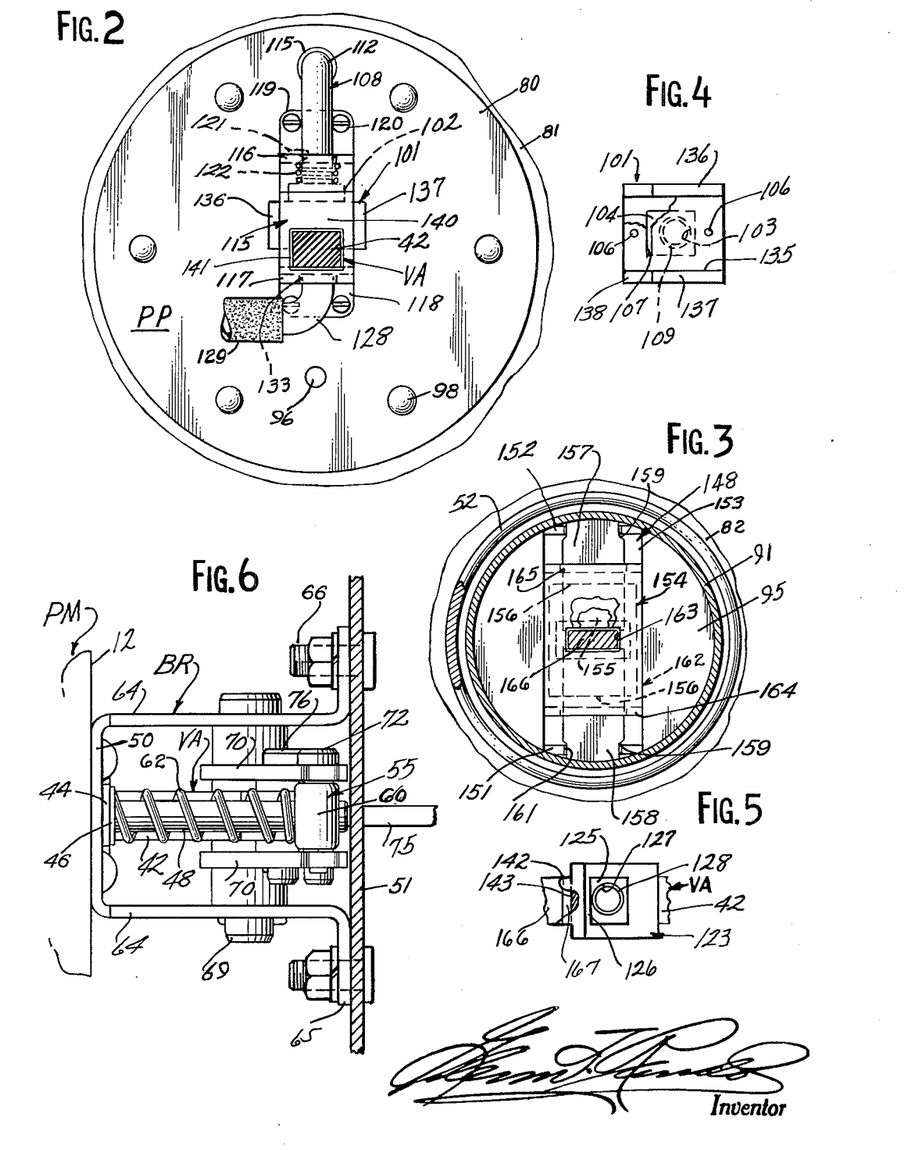
FIGURE 2 is a transverse sectional view taken along the line 2—2 of FIGURE 1 showing the right or constant pressure side of the power-piston assembly and associated portion of the control valve therefor.
FIGURE 3 is another transverse sectional view taken along the line 3—3 of FIGURE 1 showing the left or variable pressure side of the power-piston assembly and associated reaction lever mechanism.
FIGURES 4 and 5 are horizontal longitudinal sections taken along the lines 4—4 and 5—5 respectively of FIGURE 1 looking in the directions of the arrows to show the complemental working faces between the valve elements.
FIGURE 6 is a plan view partly in section of the booster motor mounting bracket assembly and associated working parts, shown attached to the forward (engine) side of the firewall of the motor vehicle.
Figures 7, 8:
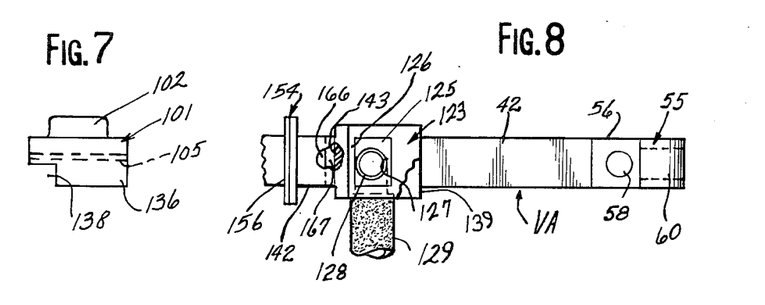
FIGURE 7 is a view of the upper valve member per se.
FIGURE 8 is a view of the valve actuator per se on which the lower valve member is mounted to move as a unit therewith.

The aforesaid novel mechanism which interconnects the brake-pedal with the valve actuator VA comprises: an inverted U-shaped member 55 provided with spaced horizontally disposed terminating legs 56, 57, said legs receiving the extreme outer end of the narrow portion 42 of the valve actuator VA therebetween for rigid connection therewith as by a rivet 58 as shown in FIGURE 1. A pair of aligned holes 59 are provided through the upper end of the member 55 adjacent the interconnecting web 60 thereof, and nested in the upper end of said member 55 is a bearing element, preferably fabricated from hard rubber or suitable plastic substance, and having a hole at 61 in registry with the holes 59 to receive therethrough the free end of the support rod 48 whereby said rod serves to slidably support the outer end of the valve actuator 48 to maintain its straight line movement as aforesaid. A normally preloaded spring 62 encircles said rod 48 to react between the aforesaid backing plate 46 and the confronting U-shaped member 55 to thereby bias the valve actuator VA toward its normally released position and the backing plate 46 against the grommet 44 to stabilize the latter in effective sealing position around the reduced portion 42 of said valve actuator. It is important to note here that the interaction of the backing plate 46 and annular lip portion 43 on the sealing grommet, under influence of the spring 62, produces novel biasing means against the lip portion to maintain the latter in airtight sealed relationship around the reduced portion 42 of the valve actuator, and at the same time, this spring serves to bias the valve actuator and connected control valve parts to their normally released positions as shown in FIGURE 1. Therefore, it may be said that spring 62 has a twofold function of maintaining the grommet seal in sealing position, and of returning the valve actuator to fully retracted position. At the intersection of the horizontally spaced legs of the member 55 with the inverted U-shaped portion thereof, a bearing space is provided at 63 between the extreme rear end of the narrow portion 42 of the valve actuator VA, and the outer portion of the member 55. The bracket BR has a pair of spaced side segments interconnected by the aforementioned end segment 50 best demonstrated in FIGURE 6, and each of these side segments is formed with an out-turned lateral flange 65 as the terminating rear end portions thereof. These flanges are suitably fixed to the firewall 51 of the vehicle, as by bolts 66, to thus mount the brake booster unit BM in operating position on the forward side of the firewall in the engine compartment of the vehicle. The contour of the lower edges of the side segments is of V-shaped configuration, and at the apexes 67 thereof, a pair of aligned holes 68 is provided. Pivotally mounted on a shaft 69 supported at its extremes in the holes 68, is a pair of spaced actuating arms 70 which straddle the intersecting portion of the U-shaped member 55. The upper ends of these arms are provided with aligned holes 71 which register with the bearing space 63 to receive a pin 72 therethrough to interconnect the arms with the actuator VA as shown for movement as a unit. Intermediate the arms 70 is another pair of aligned holes 73 which receive a pin 74 to interconnect the forward end of a link 75 therewith, said link being pivotally connected at its opposite end to the pedal P as by pin 76 as shown whereby movements of the pedal transmit corresponding movements to the arms 70 and valve actuator VA in opposition to the actuator return spring 62.

Figures 1A, 1B:
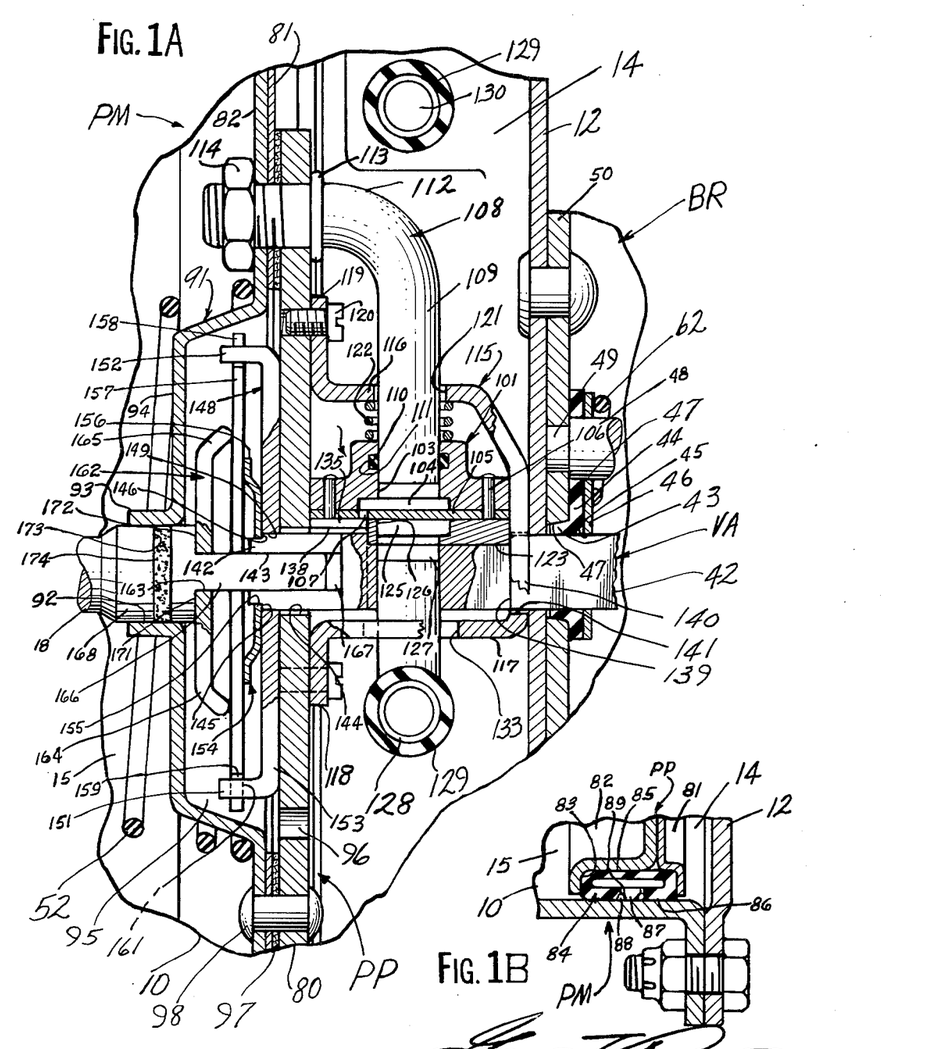
FIGURE 1A is a fragmentary sectional view taken from FIGURE 1 on an enlarged scale to clarify the detail of the control valve and associated parts.
FIGURE 1B is another fragmentary sectional view taken on an enlarged scale from FIGURE 1, to illustrate a modified form of the power-piston peripheral seal.

The power-piston PP is of novel and improved construction wherein a preferably circular master thrust plate 80 backs a juxtaposed first thrust plate 81 of annular configuration, and a secondary support and sealing plate 82, the first and second plates are horizontally flared to terminate each of their peripheral marginal portions in a short vertically disposed end to produce an annular packing channel 83 of substantially rectangular configuration. Fitted into this channel is a novel ring-like packing member, disclosed herein as a pliant tube 84, the wall of which is normally circular in cross section and characterized by resiliency, therefore deformable when installed in said rectangular channel to produce opposed inner and outer flat sides as at 85, 86, respectively, due to confinement of the tube 84 between said channel defined by the flared peripheral marginal portions of said plates, and the inner cylindrical working surface of the power cylinder 10. The interior (air-chamber) of the tubular packing 84 is normally filled with air at atmospheric pressure level but when deformed as shown in FIGURES 1 and 1B, the air-chamber in the tube is reduced in size, that is, from a circular configuration to a rectangular configuration which reduces the volumetric area thereof. This deformation of the tube induces some compressive effect on the air in the air-chamber to raise the pressure therein to super-atmospheric level which cooperates with the restorative resilient characteristic of the tube wall, to apply opposed radial pressure to the inner and outer flat sides 85, 86 of the tube 84 and thereby effects sealing relationship of the outer flat side with the working surface defining the interior of the power cylinder wall, to provide long service life characterized by effective sealing of the power-piston PP with respect to the power cylinder 10 so that the chambers 14 and 15 therein are isolated during power-activation of the booster motor PM for maximum power-thrust thereby.

The outer flat side 86 of the tube seal 84 may be optionally provided with a series of closely generated circular ribs as shown at 87 in FIGURE 1B which define shallow annular grooves 88 therebetween. These grooves being adapted to receive from the interior of the tube a small quantity of lubricant through metering holes or passages 89 to effectively lubricate the working surfaces between said tube and power cylinder. The invention also contemplates that these surface grooves in the outer flat surface of the sealing tube 84 in installed position on the power-piston PP as shown in FIGURE 1, may be partially prefilled with a suitable lubricant when the booster mechanism is assembled, so that use of the interior of the tube as a feeding reservoir to the metering passages 89 is eliminated as well as the passages themselves, thus restoring the normal function of the interior of the tube to that of an air-chamber at superatmospheric pressure level.

A central forwardly extruded embossment 91 is provided in the secondary plate 82, and which has a central circular opening 92 formed by an outturned flanged portion 93 normal to the forward vertical closure wall 94 of the embossment. A circular chamber 95 is provided between the inner side of the closure wall 94 and confronting side of the master plate 80 which serves an important purpose to be fully explained later. Chambers 14 and 95 are interconnected by a passageway 96 which passes through the master plate 80 of the power-piston assembly PP. An annular flat gasket 97 is disposed between the peripheral marginal portion of the master plate 80, and confronting surface portion on the first plate 81 for effective sealing contact between these surfaces therefore the associated plates. A plurality of rivets 98 is utilized to fasten the three plates aforesaid and the gasket in a unitary assembly as shown in FIGURES 1 and 1A.

The control valve mechanism CV is the follow-up type and possesses novel and improved structural and operational features heretofore not appreciated by workers in the are. As best shown in FIGURE 1A, this valve mechanism comprises an upper valve member 101 of rectangular shape and movable axially as a unit with said power-piston PP and characterized by radial floating movement with respect to the axis of the power-piston, a centrally disposed upstanding circular loss 102 with a hole 103 therethrough in communication with an air-vacuum chamber 104 in the opposite side of said member. In airtight fitted relationship to the opposite (bottom) side of the member 101, is a plate 105 held in position by a pair of dowel pins 106. This plate defines the lower side of the air-vacuum chamber 104 and is provided with a preferably rectangular air-vacuum control slot 107. Interconnecting the power chamber 15 with the air-vacuum chamber 104 in the valve member 101 is a tubular elbow-type conduit 108 having a vertical portion 109 the lower end of which enters the hole 103 in airtight sealed relation by an encircling pliant packing 110 carried in an internal annular groove 111 formed in the circular wall of said hole. The upper horizontal portion 112 of this conduit is provided with an outstanding circular bead 113 spaced from an externally threaded end portion thereof. The threaded end portion projects through aligned holes passing through the three plates and gasket aforesaid shown, and a lock-nut 114 is tightly threaded on the exposed threaded end portion against the secondary plate to effect a rigid airtight assembly of the conduit and power-piston as shown. A generally horizontally disposed U-shaped bracket member (cage) 115 is provided with spaced top and bottom legs 116, 117, respectively, which terminate forwardly in outstanding lateral flanges 118, 119, respectively, which serve to mount the member 115 on the power-piston as by four cap screws 120 as shown. The top leg is provided with an opening 121 through which the conduit 108 passes into connection with the radially floating valve member 101 in the manner explained above, and a normally preloaded spring 122 encircles that portion of the conduit between the top leg and confronting end of the boss 102 to react between the said leg and valve member 101 to maintain intimate surface contact with a complemental lower valve member 123 mounted in a cross channel 124 in the upper side of the normal portion 41 of the valve actuator VA as shown in FIGURE 1 whereby the actuator and valve member move as a unit at all times.

The valve member 123 is provided with a vacuum chamber 125 underlying the plate 105, and a working land 126 which defines the left side of said vacuum chamber. Communicaitng with said vacuum chamber is an opening 127 in which is fitted in airtight sealed relation the upper end of a rigid tubular fitting 128 connected at its lower end by a short section 129 of flexible conduit to a rigid tubular fitting 130 leading to the exterior of the power cylinder casing 10 as conventionally shown at 131 in FIGURE 1. The flexible characteristic of the conduit 129 accommodates relative movement of the power-piston and associated control valve mechanism with respect to the power cylinder 10 when the power-piston is activated. An opening 133 is provided in the bottom leg of the member 115 for the upper end of the fitting 128 to pass through the connection with the valve member 123 as explained above. This latter opening is made sufficiently large, preferably oblong to accommodate the relative operating movement of the valve actuator VA to place the valve mechanism CV in "off" and "on" operating positions for power-inactivation and activation, respectively, of the power cylinder 10.

The width of the valve member 123 is identical to that of the normal width 41 of the valve actuator VA. A longitudinal channel 135 is provided below the control plate 105 on the upper valve member 101 by integral side flanges 136, 137 depending from the member 101. Slidably disposed in this channel is the movable valve member and an adjacent portion of the valve actuator portion 41, with the forward portions of these flanges cut away as at 138 to expose the control slot 107 in the plate 105 to the atmospheric chamber 14 to the right of the power-piston PP whereby this opening 138 communicates pressure at the atmospheric level to the air-vacuum chamber 104 to balance pressures in the power cylinder chambers 14, 15 to inactivate the motor PM, when the valve mechanism CV is in its normal "off" position as shown. It is therefore seen that the channel 135 maintains the two valve members 101, 123 in correct rectilinear operating relationship so that the complemental working surfaces therebetween may effectively seal the air-vacuum and vacuum chambers therebetween from each other, and at the same time accommodate relative operating (sliding) movement of said valve members to their operating positions to control activation of the motor PM.

Attention is now directed to the functions of the member 115 carried by the power-piston PP. This member serves to stabilize the valve member 101 in the position shown in FIGURE 1 wherein the latter member moves with the power-piston PP yet has radial floating action with respect to the power-piston PP. Also member 115 serves as a stop for the valve actuator VA to define its normal released position by the two opposed lateral shoulders 139 on the valve actuator VA at the juncture of the narrow portion 41 with the wide portion 42 thereof, engaging the vertical end segment 140 of member 115 through which a rectangular aperture 141 is provided for the portion 42 of the valve actuator to project through to the exterior of the power cylinder casing 10 as shown in FIGURE 1. Since both of the valve elements are longitudinally encircled by the U-shaped bracket member 115, the latter may be termed a "valve cage" to control rectilinear movements of the valve elements and to define the relative normal positions thereof.

The forward end portion 142 of the valve actuator VA is horizontally cross slotted at 143 and of the same width as the rearwardly projecting narrow portion 42, said forward end projecting through a correspondingly formed aperture 144 through the central portion of the master plate 80. The extreme ends of the outer sides of the two legs defining the slotted portion aforesaid are each provided with a shoulder at 145 and 146 respectively.

A vertical U-shaped pressure member 148 is juxtaposed with respect to the master plate 80 in the embossment chamber 95 to intimately engage with said plate for movement as a unit, said member 148 having a central rectangular opening 149 to accommodate projection of the forward end of said actuator VA into said chamber, said opening 149, and the aperture 144 in the plate 80 being of the same size in alignment with each other. The pressure member 148 terminates at its opposite ends in forwardly extending legs 151, 152 normal to the vertical segment 153 thereof. A flat spring 154 having a central aperture 155 of substantially the same size and shape as the outer contour of the shouldered ends of said valve actuator VA, is carried against said shoulder in contact with the master plate 80 when the parts are in their normally released positions shown in FIGURE 1. The outer ends 156 of the flat spring are adapted to bear against an intermediate portion of a pair of oppositely disposed reaction members or levers 157. These two reaction levers each has its outer end terminating in a reduced width portion 158 which forms lateral shoulders at 159 with the normal width of the same. These reduced portions are received into a slot 161 provided in each of the legs 151, 152 to stabilize them in operating position with respect to the pressure member best demonstrated in FIGURE 3. On the forward side of the reaction levers there is provided a fulcrum member 162 having a central rectangular aperture 163, and preferably terminating at its opposite ends into rearwardly projecting angular legs 164, 165. Projecting through the aperture 163 is an element 166 of similar cross sectional configuration to that of the said aperture, and which supports the inner confronting ends of the reaction levers and the end portion of this element which is slidably supported in the cross slot 143 and normally spaced at 167 from the bottom of said slot to provide the relative operating movement of the valve actuator VA to operate the valve mechanism CV. The element 166 is integral with a cylindrical portion 168 on the master cylinder push-rod 18 adapted to actuate the hydraulic piston 19, or such push-rod and piston may be integrated as a unitary element. Oppositely disposed shoulders 171, 172 are formed at the juncture of the cylindrical portion 168 which act on the forward marginal portion of the aperture 163 to displace the fulcrum member rearwardly in unison with said push-rod, and thereby react on an intermediate portion of the reaction levers with the inner ends of the latter being engageable by the ends of the bifurcated inner end portion of the valve actuator VA when the latter is activated in a motor-energizing direction from the position of FIGURE 1. Accordingly, the reaction levers are provided with two pressure points at their extremes, and a fulcrum point intermediate said extremes whereby when the motor PM is energized, the inner ends of the bifurcated end portion of the valve actuator VA engage the inner ends of the reaction levers, and as power is developed in the motor, the outer ends of the reaction lever are rocked on their respective fulcrum point by the hydraulic reaction on the push-rod induced as pressure build-up develops which actually moves the fulcrum 162 in slightly spaced relation with respect to the inner side of the embossment 91. In this manner the reactive forces from the hydraulic master cylinder MC react proportionally on the power-piston PP and the valve actuator VA to divide the work of brake application substantially 2:3 ratio between the operator and said motor, respectively.

The cylindrical portion 168 on the push-rod, is provided with an external annular groove 173 fitted with a pliant O-ring 174 adapted to engage the inner cylindrical surface of the opening 92 in which said portion operates, to thus isolate the power chamber 15 from the embossment chamber 95, and thereby seal off the atmospheric chamber 14 from said chamber 15 in the power cylinder 10, it being recalled that the chamber 95 is interconnected with the chamber 14 at all times via the vent passage 96 through the master plate 80 of the power-piston assembly PP to maintain atmospheric pressure in both of these latter two chambers.

The master cylinder piston 19 may be operated directly by the pedal P, which operation is commonly termed "straight-through" since the pedal alone may be relied on for brake actuation in the event of power failure, or under conditions where the maximum power output by the motor PM needs assistance from the operator to produce the required braking pressure. This "straight-through" operation is effected by moving the bottom of the cross slot 143 in the bifurcated inner end portion of the actuator VA into engagement with the end of the push-rod terminal element 166 wherein the full relative operating movement at 167 of the valve mechanism CV is taken up, thereby transmitting operator force on the pedal P directly to the push-rod 18, thence to the hydraulic piston 19 to actuate the latter to apply the brakes.

*Operation*

Figure 9:
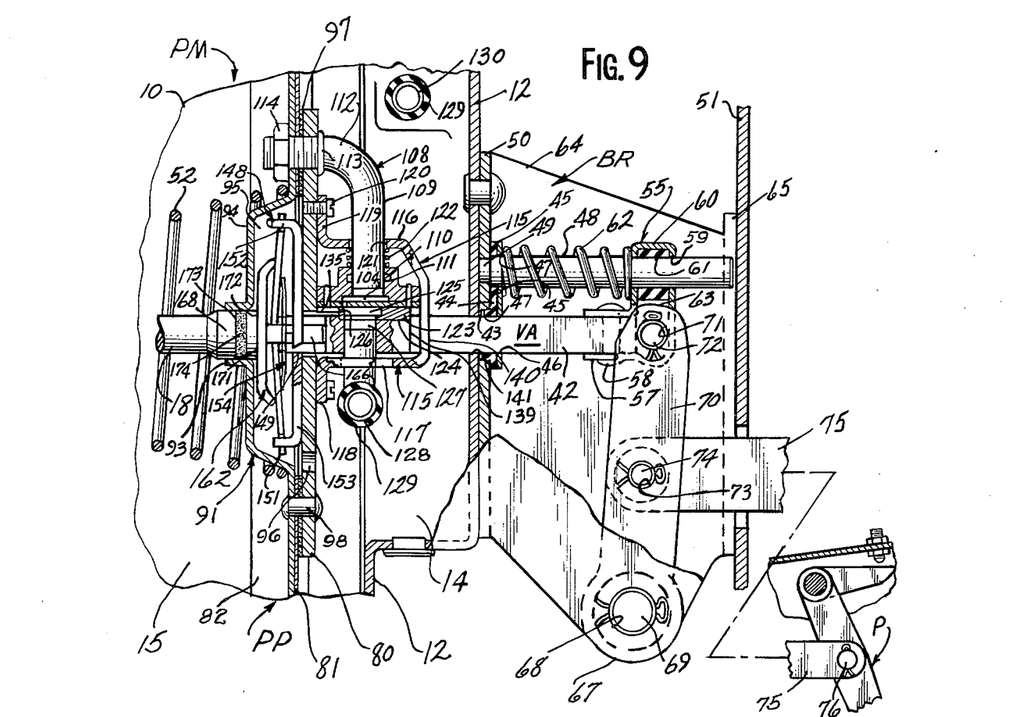
FIGURE 9 is a fragmentary reproduction of FIGURE 1 similar to FIGURE 1A but showing the control valve mechanism and associated parts in relatively adjusted positions corresponding to the operatively energized status of the booster motor.

In operation, when the pedal P is depressed, the link 75 is moved in left-hand direction, as viewed in FIGURE 1. Initial movement of the link simultaneously advances the valve actuator VA in the same direction to effect relative displacement of the valve member 123 with respect to the valve member 101 and thereby positions the working land 126 to the left of the air-vacuum control slot 107 in the plate 105 mounted on the underneath side of the valve member 101, to place the chambers 125, 104 in communication with each other to isolate the atmospheric chamber 14 from the power chamber 15 and to evacuate the air from the latter chamber via the conduits 108, 129. This evacuation process produces differential pressures on opposite sides of the power-piston PP due to the negative (vacuum) pressure in the power chamber 15 and the constant (atmospheric) pressure continuously effective in the chamber 14, to thus energize and move the power-piston PP to the left as shown in FIGURE 9, which movement will continue as long as pressure is increasingly applied by the operator to the pedal P, to actuate the hydraulic displacement member 18 to apply the vehicle brakes in a well known manner.

During this energizing movement of the power-piston PP in the manner above-described, a portion of the relative operating movement between the valve member 101, 123 is taken up to reduce the space 167 between the end of the element 166 and the bottom of the cross slot 143 in the forward inner end of the valve actuator VA. At the same time the shoulders 145, 146 are brought into engagement with the inner ends of their respective reaction levers 157, and the movement of the power-piston PP transmits pressure to the pressure member 148 and thereby to the outer ends 156 of the reaction levers tending to rock said levers on their inner pressure points at the shoulders 145, 146 effected by the operator. This cooperative pressure application by the operator via the pressure points 145, 146 and by the power-piston PP via the pressure points 151, 152 is transmitted from an intermediate point on the forward sides of the reaction levers to the fulcrum points 164, 165, and as pressure reaction builds up on the hydraulic displacement member (piston 19) such reaction is transmitted via the push rod 18 to the fulcrum member 162 to oppose the aforesaid cooperative forces produced by the operator and by the power-piston PP to slightly separate the fulcrum member 162 from the vertical wall 94 of the embossment 91 whereby power and operator forces are transmitted proportionally through the reaction levers 157 to the fulcrum member 162 and thence to the push-rod 18 and connected hydraulic displacement piston 19 to pressurize the brake fluid in the hydraulic working chamber 25, brake lines, and wheel cylinders to apply the vehicle brakes in a well known manner.

Accordingly, from the foregoing it is seen that when chamber 15 is connected to the source of negative (vacuum) pressure, such chamber is evacuated of air according to control valve actuation. Thus, atmospheric pressure reacting on the right-hand face of the power-piston PP causes movement of the power-piston in a left-hand direction against the compression return spring 52 (see FIGURE 9).

So long as the advancement of the pedal link 75 and the power-piston PP are substantially the same, pressure will be continuously applied to the brake fluid in the master cylinder MC by simultaneous movement of the fluid-displacement parts 18, 19 whereby fluid under pressure will be delivered to the wheel cylinders to apply the brakes.

However, should the action of atmospheric pressure on the power-piston PP cause the power-piston to move more rapidly leftward than the rate of forward advancement of the pedal actuated valve actuator VA, or should the operator halt depressing movement of the brake pedal, thus stopping forward movement of the valve actuator VA, the power-piston PP will advance only sufficiently for the valve working land 126 to fully cover the control slot 107 and thereby cut off connection between the power chamber 15 and the source of negative pressure in the vacuum chamber 125. Slight additional movement of the valve member 123 at this time toward the end wall 12 of the power cylinder 10 will move the working land 126 out of registry with the control slot 107 and thereby again enabling atmospheric pressure to be conveyed through the openings 138, air-vacuum chamber 104, conduit 108 into the power chamber 15 to balance pressures within the power cylinder chamber 14, 15 to inactivate the motor PM, wherein the normally retracted position of the motor is established by engagement of the shoulders 139 with the interconnecting segment 140 of the U-shaped member 115, and this segment in contact with the inside portion of the end wall 12 which encircles the narrow portion 42 of the valve actuator VA at substantially the juncture of the narrow and normal width portions, all as shown in FIGURE 1.

The foregoing brake-applying cycle describes the applied, holding, and release phases to complete the cycle as is understood.

It will be understood that the foregoing operational description states that the power-piston PP will exactly follow the advancement of the pedal P from normal released position thereof, and thus respond exactly to the brake action applied by the operator to the brake-pedal P.

During brake release, operator force is removed from the pedal P to enable it to retract to its normal released position as shown in FIGURE 1. This releasing movement of the pedal withdraws the valve actuator VA and associated valve member 123 to enable the latter to assume its normal "off" position with respect to the valve member 101 wherein the segment 140 of the U-shaped member 115 is engaged by the movable valve member 123 and shoulders 139 on the actuator VA, and the segment 140 in turn is placed in contact with the inner side of the end wall 12 as shown. Upon pressures in the power cylinder chambers 14, 15 reaching a substantially balanced status, the spring 52 becomes effective to move the power-piston PP in a righthand direction to its normally released position as viewed in FIGURES 1 and 1A.

Retractive movement of the power-piston PP will cause the fluid-displacing components 18 and 19 to be retracted under influence in part of the master cylinder piston return spring 35 to take the vehicles brakes "off." Cooperating with this spring, is the return spring 52 for the power-piston PP, and the valve actuator return spring 62. In certain installations an additional spring (not shown) may be applied directly to the brake-pedal to effect its retraction to normally released position, such pedal release spring in the present arrangement, would be of such strength so as to substantially counterbalance the weight of the pedal assembly to keep pedal depressing effort as low as possible.

In summary, it is manifest from the foregoing disclosure that the present brake booster BM is of simple and economical construction for association with conventional firewall mounted master cylinders to pressurize in part the brake fluid in the hydraulic brake system as is understood. The novel power-piston sealing member 84 and self-contained lubricating means therefor (see FIGURE 1B) insure long service life for this component.

In the FIGURE 1 form of the tubular seal 84, the interior of the tube would contain super-atmospheric pressure only when installed since the function of the metering holes 89 would not be required thus eliminating these holes. In the case where the modified sealing tube shown in FIGURE 1B is used, the metering holes 89 would serve to reduce the super-atmospheric pressure within the seal, so that only a small amount of compressive effect if any would be active due to escape of air through the holes 89 thence past the outer surface on the seal. Under such conditions, the resiliency of the tube wall would tend at all times to bias the installed rectangular configuration thereof back to its normally relaxed circular configuration to provide the necessary radial tension to effect airtight sealing between the working surfaces on the sealing tube and interior of the power cylinder wall 10, which sealing action would also be influenced by whatever compressive effect may exisit within the seal. Therefore, the continuous reaction of the seal wall to return to its normally relaxed circular configuration would insure effective sealing, and too, this tension in the seal would supplement the super-atmospheric condition within the seal in the form illustrated by FIGURE 1.

The novel control valve employed to control power-activation of the booster motor PM overcomes the problem of sealing against leakage by utilizing the aforedescribed and illustrated pair of valve elements relatively displaceable from a normal "off" position wherein the booster motor PM is inactivated to an operating "on" position wherein it is activated, said elements having complemental working surfaces intimately engaged under influence of joint pressure from the associated spring 122 and pressure differential effective over a predetermined area of said elements to maintain their interiors effectively isolated from the exteriors thereof, yet accommodating relative sliding movement therebetween for valve operation as described.

Another special advantage is provided by the disclosed novel control valve mechanism CV, in that it may be readily serviced separately from the power-piston assembly PP, without the added cost of having to replace part or all of the elements comprising the power-piston as would be required in the case of prior art power-brakes which integrate the valve mechanism in part at least with the power member making it necessary to service both components when only one or the other may be malfunctioning.

This easy assembly and disassembly of the control valve CV is accomplished by removing the four cap screws 120, for inspection and/or replacement of the three principal elements; namely, the upper and lower relatively movable members 101, 123, and the support bracket 115 which assembles these two members on the power-piston PP to operate relatively and as a unit therewith.

Reference is now made to the terminology used in the foregoing description and in the appended claims in which the identifying expressions and/or terms employed are intended to convey meanings which include the range of reasonable equivalents in the patent sense. For example, the expressions, "motor," "chambers," "power cylinder," "casing" are intended to include any means for pressurizing the fluid, whether such means are flexible diaphragm or a solid assembly, or some other type of power assembly serving the same purpose. Directional words or characters, such as "top," "bottom," "upper," "lower," "right," "left" are intended to have only relative connotation for convenience in describing the structure as it appears in the drawings, and are not intended to be interpreted as requiring any particular orientation with respect to associated structure external to the present disclosure or to the operating position hereof.

While a preferred embodiment of the invention as herein disclosed constitutes a preferred form, it is to be understood that other arrangements, variations, and substitutions might be adopted as may come within the fair meaning and scope of the subjoined claims.

Having thus described my invention, I claim:

1. In a booster-type motor for a brake having a casing, and a power member movable from a normal position within said casing and producing therewith a variable pressure chamber and a constant pressure chamber, the improvement which comprises a valvular construction having a pair of elements, each being provided with a planar working surface in intimate contact with the other, said elements being relatively displaceable from normal 'off" position wherein the pressures within said chambers are balanced for power-inactivation of said motor, and to an operating "on" position wherein differential pressures are established in said chambers for power-activation of said motor; a fixed member rigid with said power member; a normally pre-loaded spring reacting between said fixed member and one of said valve element in cooperation with differential pressures effective on a predetermined area of said valve elements to maintain said intimate contact between said valve elements irrespective of the relative disposition thereof; a vacuum valve chamber in the other of said valve elements; an air-vacuum valve chamber in the said one valve element; a divider plate overlying the side of said one valve element opposite the side thereof receiving reaction from said spring, and adapted to separate the two said valve chambers from each other; an opening in said plate normally interconnecting said constant pressure chamber with said air-vacuum chamber; a working land defining one end of said vacuum valve chamber, and co-planar with the working surface of the other valve element, said land being adapted to control said opening; a valve actuator slidably projecting into said casing; means on said actuator for receiving the other valve element for movement as a unit therewith; a central aperture in said power member through which the forward end of said actuator slidably projects to the opposite side thereof; a shoulder on said actuator for engaging said fixed member to establish the normal released position thereof; a horizontal cross slot in the forward end of said actuator; a thrust-transmitting member having its inner end slidably supported in said cross slot for coaxial reciprocable movement relatively and together therewith; an operator-operated member connected to said actuator for effecting relative displacement of said valve elements in response to imparting sliding movement to said actuator; spring means including a normally preloaded spring for biasing said power member and valve actuator to their respective normally released position; and reaction means for transmitting reaction from said thrust-transmitting member to said power member and said valve actuator.

2. A booster-type motor constructed in accordance with claim 1 in which said reaction means comprise: a plurality of radial levers each fulcrumed intermediately its outer and inner ends on said thrust-transmitting member, and its outer and inner ends engageable by said power member and valve actuator respectively.

3. A booster-type motor constructed in accordance with claim 1 in which said valve actuator comprises: two different merging rectangular cross sectional portions, the larger section being wholly disposed within said motor casing and the smaller section projecting to the exterior of said motor casing for connection with said operator-operated member, and additionally includes a support member fixed at one end to the exterior of said motor casing, a bearing extension integrally projecting from said outer portion and is slidably supported on said support member whereby said valve actuator is maintained in its rectilinear path of movement, and a normally preloaded helical spring encircles said support rod to react between said motor casing and bearing extension to bias said valve actuator to its normal released position.

4. A fluid pressure motor device comprising a cylindrical casing having a pressure-responsive unit dividing said casing to form a constant pressure chamber and a variable pressure chamber, the former of which is connected to atmosphere, said unit comprising: a pair of juxtaposed circular plates each having their peripheral marginal portions oppositely flanged to define an annular channel therebetween, one of said plates serving to impart thrust, and the other plate serving to support and seal the thrust plate; a pliant annular packing of normally relaxed tubular cross section filled with air at atmospheric pressure, said packing engaging said channel in deformed cross section to effect compression on the air within said packing to create radial tension therein to intimately engage the outer peripheral surface of the packing with the interior cylindrical surface of the casing to effect an airtight seal therebetween, and thereby seal off the said motor chambers from each other; a power transmitting member acted on by said unit; follow-up control valve mechanism carried in part by said unit, said valve mechanism comprising: a pair of rectangularly-shaped members each provided with a planar working surface in intimate sliding contact at all times; an air-vacuum chamber in one of said valve members selectively connectible to said variable pressure chamber and atmosphere; a vacuum chamber in the other of said valve members connected to a source of pressure different from atmosphere; a valve plate movable as a unit with one of said valve members for separating said valve chambers, the said valve plate defining the planar working surface of the valve member movable therewith; a control opening through said valve plate normally open to vent the air-vacuum chamber to said constant pressure chamber in the motor casing; a working land on one of the said valve members operatively associated with said control opening, and which communicates with said vacuum chamber for selectively connecting said control opening in the valve plate to said valve chambers to control operative energization of said motor device; a fixed member carried by said unit and disposed in overlying relation to said one valve member; a first normally preloaded spring reacting between said fixed member and one valve member to maintain the latter member in intimate sliding contact with the other valve member; a valve actuator; means on the valve actuator for moving the other valve member relatively to the one valve member; a projection on said actuator engageable with said fixed member to define the normal released position thereof; a cross slot in the inner end of said actuator defining two legs; a central aperture through the unit plates through which said inner end of the actuator projects; a complemental extension on the inner end of the power transmitting member engaging said cross slot to support the latter member and accommodate relative and unison movement of the actuator and unit with respect thereto; an offset in the extreme ends of the legs aforesaid to provide an external shoulder on each; a central atmospheric chamber provided between said unit plates, said chamber being in continuous communication with said constant pressure chamber in the motor casing; a U-shaped pressure transmitting member disposed within said central chamber in juxtaposition with respect to the thrust plate for movement therewith, the extremities of which are formed as horizontal legs parallel with the axis of said power transmitting member; a pair of diametrically disposed reaction levers disposed within said central chamber and having their inner ends engageable with the ends of said legs on the valve actuator, and their outer ends engageable with the legs on the U-shaped member to provide pressure points therefor from the valve actuator and the unit respectively; another U-shaped member disposed within said central chamber in opposite disposition with respect to said first-named U-shaped member, said other U-shaped member having a complemental central aperture through which the extension on said power transmitting member projects; a second normally preloaded spring reacting between said shoulders and an intermediate portion on said reaction levers to bias the latter to normal positions wherein their inner ends are slightly spaced from the ends of the legs on said actuator; a shoulder provided on the power transmitting member at the juncture of a cylindrical portion with said extension, said shoulder being adapted to engage said other U-shaped member to move together; a pair of diametrically disposed horizontal legs terminating said other U-shaped member and spaced from each other at a lesser distance than the space between the legs on the first-named U-shaped member, to engage an intermediate point on the side of the reaction levers opposite to said extreme pressure points, to serve as a fulcrum point for said reaction levers whereby forces on said power transmitting member react proportionally on the valve actuator and said unit; a cylindrical opening through the central portion of the sealing plate to receive the cylindrical portion on the power transmitting member; an annular external groove in the cylindrical portion on the power transmitting member; an annular packing engaging said groove to effect an airtight seal between said variable pressure chamber and said central chamber, and accommodate limited relative movement between said power transmitting member and unit; a third normally preloaded spring disposed within said variable pressure chamber to react between said motor casing and said unit to bias the latter to its normal released position; a fourth normally preloaded spring associated with said valve actuator to react between said motor casing and said actuator to return the latter to its normal released position; and an operator-operated member for actuating said valve actuator.

5. A motor device constructed in accordance with claim 4 in which the pressure differential effective on the opposite outer sides of said valve members induced by negative pressures when effective within said vacuum valve chamber, cooperate with said first spring to prevent vacuum loss from said vacuum chamber.

6. In control valve mechanism adapted to control a wall movable from a normal position under influence of a pressure differential, and a source of pressure different from atmosphere communicable with one side of said wall to establish said pressure differential, the improvement which comprises: a pair of relatively displaceable valve members, each being provided with a planar working surface with said members being under continuous joint influence of differential and spring pressures to maintain said working surfaces in intimate sealing contact; an air-vacuum chamber in one of said valve members selectively connectible to the one side of said wall and to atmosphere; a vacuum chamber in the other of said valve members having continuous communication with said source; a valve plate movable as a unit with one of said valve members for separating said valve chambers, and which defines the planar working surface thereof; a control port through said valve plate normal open to vent the air-vacuum chamber to atmosphere; a working land on the other of said valve members operatively associated with said control port, and which continuously communicates with said vacuum chamber for selectively connecting said control port in the valve plate to said valve chambers; a U-shaped member having a pair of spaced horizontal segments connected by an end segment spaced from said wall, and movable as a unit with said wall in longitudinally encircling relationship with respect to said valve member; a normally preloaded spring reacting between said movable member and one valve member to maintain the latter member in intimate sealing contact with the other valve member; a valve actuator projecting through an opening in the end segment of said U-shaped member; means on the valve actuator for displacing the other valve member relatively to the one valve member; a projection on said actuator engageable with a portion of said U-shaped member to define the normally released position thereof; and an operator-operated member having a normally released position, and adapted to act through an interconnecting link on said actuator to actuate the other valve member thereby effecting relative displacement of the said latter member with respect to the one valve member to place the vacuum chamber in communication with said control port.

7. Control valve mechanism constructed in accordance with claim 6 in which the said actuator and associated valve members are characterized by rectilinear movements relatively and as a unit to selectively place the said control port in communication with the said two valve chambers.

8. A pressure differential booster motor adapted to actuate in part the hydraulic master cylinder of a brake system, and comprising a housing having an aperture; a movable wall in said housing producing a constant pressure chamber at one side and a variable pressure chamber at the other side; an operator-operated control member characterized by relative sliding movement in said wall between predetermined limits with a portion of the former projecting through the aperture in said housing to the exterior thereof; a valve cage having a centrally apertured end segment longitudinally spaced from said wall and movable as a unit therewith, said aperture in said end segment being coaxial with the aperture in said housing; a valve member loosely spanning a portion of the space between said wall and said end segment to have unitary axial and limited relative radial movements with respect to said wall; a valve-forming element on a different portion of said control member adapted to project from said aperture in said end segment into slidably sealed relationship with said valve member, said radial movements of the latter member compensating for axial disalignment of said control member with respect to said wall to maintain such sealed relationship therebetween; and cooperating fluid-controlling portions on said valve member and valve-forming element, respectively, for admitting fluid from a source of pressure to said variable pressure chamber to create a pressure differential on said wall effective to move the latter, in response to sliding movement of said control member relative to said valve member and wall within said predetermined limits.

9. A pressure differential booster motor adapted to actuate in part the hydraulic master cylinder of a brake system, and comprising a housing having an aperture; a movable wall in said housing producing a constant pressure chamber at one side and a variable pressure chamber at the other side; an operator-operated control member characterized by relative movement in said wall between predetermined limits with a portion of the former projecting through the aperture in said housing to the exterior thereof; a valve member movable as a unit with said wall from a normal position of the latter; a valve-forming element on a different portion of said control member adapted to move relatively to said valve member in sealed relationship therewith; cooperating fluid-controlling portions on said valve member and valve-forming element, respectively, for admitting fluid from a source of pressure to said variable pressure chamber to create a pressure differential on said wall effective to move the latter, in response to relative movement of said control member with respect to said valve member and wall, within said predetermined limits; an annular resilient packing associated with the aperture in said housing, and through which said control member projects to the exterior of said housing in sealed relation thereto; a pressure-applying plate contiguously disposed with respect to said packing to stabilize the same in sealing relation around said control member and to exert axially and radially inwardly biasing forces thereagainst, said plate being complementally apertured coaxially with respect to the aperture in said housing to accommodate projection of the first-named portion of said control member to the exterior as aforesaid; and a normally preloaded spring reacting between said pressure plate and said control member to bias said plate against said packing in sealing relation around said control member, and to bias the latter toward its normal position.

References Cited by the Examiner

UNITED STATES PATENTS

| | | | |
|---|---|---|---|
| 6,974 | 12/49 | Moat | 277—34 |
| 777,655 | 12/04 | Badeker | 277—118 |
| 801,959 | 10/05 | Badeker | 277—118 |
| 2,309,658 | 2/43 | Miller | 277—34 |
| 2,894,490 | 7/59 | Ingres. | |
| 2,900,054 | 8/59 | Rockwell | 60—54.5 |
| 3,002,499 | 10/61 | Schultz | 91—369 |
| 3,013,535 | 12/61 | Schultz | 91—369 |
| 3,037,486 | 6/62 | Taylor. | |
| 3,049,100 | 8/62 | Rike | 91—369 |

FRED E. ENGELTHALER, *Primary Examiner.*

KARL J. ALBRECHT, SAMUEL LEVINE,
*Examiners.*